United States Patent
Fleming

(10) Patent No.: US 8,348,190 B2
(45) Date of Patent: Jan. 8, 2013

(54) DUCTED FAN UAV CONTROL ALTERNATIVES

(75) Inventor: Jonathan Fleming, Blacksburg, VA (US)

(73) Assignee: Honeywell International Inc., Morristown, NJ (US)

( * ) Notice: Subject to any disclaimer, the term of this patent is extended or adjusted under 35 U.S.C. 154(b) by 662 days.

(21) Appl. No.: 12/359,407

(22) Filed: Jan. 26, 2009

(65) Prior Publication Data

US 2010/0187369 A1    Jul. 29, 2010

(51) Int. Cl.
*B64C 29/00* (2006.01)
(52) U.S. Cl. .................................................. 244/23 D
(58) Field of Classification Search ............. 244/12.5
See application file for complete search history.

(56) References Cited

U.S. PATENT DOCUMENTS

| | | | |
|---|---|---|---|
| 2,929,580 A * | 3/1960 | Ciolkosz | 244/12.5 |
| 2,968,453 A * | 1/1961 | Bright | 244/12.5 |
| 3,861,822 A | 1/1975 | Wanger | |
| 4,071,207 A * | 1/1978 | Piasecki et al. | 244/23 D |
| 4,279,568 A | 7/1981 | Munroe | |
| 4,652,208 A | 3/1987 | Tameo | |
| 4,664,340 A | 5/1987 | Jackson | |
| 4,795,111 A | 1/1989 | Moller | |
| 5,042,245 A | 8/1991 | Zickwolf, Jr. | |
| 5,150,857 A | 9/1992 | Moffitt et al. | |
| 5,152,478 A | 10/1992 | Cycon et al. | |
| 5,190,439 A | 3/1993 | Das | |
| 5,295,643 A * | 3/1994 | Ebbert et al. | 244/7 B |
| 5,390,877 A * | 2/1995 | Nightingale | 244/23 D |
| 5,505,407 A * | 4/1996 | chiappetta | 244/2 |
| 5,575,438 A | 11/1996 | McGonigle et al. | |
| 5,695,153 A | 12/1997 | Britton et al. | |
| 6,170,778 B1 | 1/2001 | Cycon et al. | |
| 6,318,668 B1 * | 11/2001 | Ulanoski et al. | 244/12.5 |
| 6,422,508 B1 | 7/2002 | Barnes | |
| 6,450,445 B1 | 9/2002 | Moller | |
| 6,502,787 B1 | 1/2003 | Barrett | |
| 6,575,402 B1 | 6/2003 | Scott | |
| 6,588,701 B2 | 7/2003 | Yavnai | |
| 6,604,706 B1 | 8/2003 | Bostan | |
| 6,622,090 B2 | 9/2003 | Lin | |
| 6,665,594 B1 | 12/2003 | Armstrong | |

(Continued)

FOREIGN PATENT DOCUMENTS

EP    1767453 A1    3/2007

(Continued)

OTHER PUBLICATIONS

Moran, Patrick J., "Control Vane Guidance for a Ducted-Fan Unmanned Air Vehicle," Naval Postgraduate School Master's Thesis, Jun. 1993, Abstract.

(Continued)

*Primary Examiner* — Tien Dinh
*Assistant Examiner* — Keith L Dixon
(74) *Attorney, Agent, or Firm* — Shumaker & Sieffert, P.A.

(57) ABSTRACT

A ducted fan air-vehicle having alternative methods of control is described. The ducted fan air-vehicle includes an air duct, a fan, a center body, a plurality of control vanes. Each control vanes includes a separate servo for independent control of each control vane, and is therefore able to operate the control vanes in a non-traditional manner to provide maximum control authority.

20 Claims, 5 Drawing Sheets

U.S. PATENT DOCUMENTS

| | | |
|---|---|---|
| 6,691,949 B2 | 2/2004 | Plump et al. |
| 6,694,228 B2 | 2/2004 | Rios |
| 6,712,312 B1 | 3/2004 | Kucik |
| 6,721,646 B2 | 4/2004 | Carroll |
| 6,808,140 B2 | 10/2004 | Moller |
| 6,813,559 B1 | 11/2004 | Bodin et al. |
| 6,824,095 B2 | 11/2004 | Mao |
| 6,847,865 B2 | 1/2005 | Carroll |
| 6,873,886 B1 | 3/2005 | Mullen et al. |
| 7,000,883 B2 | 2/2006 | Mercadal et al. |
| 7,032,861 B2 | 4/2006 | Sanders, Jr. et al. |
| 7,044,422 B2 | 5/2006 | Bostan |
| 7,158,877 B2 | 1/2007 | Carlsson et al. |
| 7,228,227 B2 | 6/2007 | Speer |
| 7,231,294 B2 | 6/2007 | Bodin et al. |
| 7,249,732 B2 | 7/2007 | Sanders, Jr. et al. |
| 7,289,906 B2 | 10/2007 | Van der Merwe et al. |
| 7,299,130 B2 | 11/2007 | Mulligan et al. |
| 7,302,316 B2 | 11/2007 | Beard et al. |
| 2003/0136873 A1 | 7/2003 | Churchman |
| 2004/0094662 A1 | 5/2004 | Sanders, Jr. et al. |
| 2004/0129828 A1 | 7/2004 | Bostan |
| 2005/0082421 A1 | 4/2005 | Perlo et al. |
| 2005/0165517 A1 | 7/2005 | Reich |
| 2006/0049304 A1 | 3/2006 | Sanders, Jr. et al. |
| 2006/0102780 A1 | 5/2006 | Parks |
| 2006/0106506 A1 | 5/2006 | Nichols et al. |
| 2006/0192047 A1 | 8/2006 | Goossen |
| 2006/0231675 A1 | 10/2006 | Bostan |
| 2006/0287824 A1 | 12/2006 | Lin |
| 2007/0018052 A1 | 1/2007 | Eriksson |
| 2007/0034734 A1 | 2/2007 | Yoeli |
| 2007/0034738 A1 | 2/2007 | Sanders, Jr. et al. |
| 2007/0051848 A1 | 3/2007 | Mantych et al. |
| 2007/0069083 A1 | 3/2007 | Shams et al. |
| 2007/0129855 A1 | 6/2007 | Coulmeau |
| 2007/0193650 A1 | 8/2007 | Annati |
| 2007/0200027 A1 | 8/2007 | Johnson |
| 2007/0221790 A1 | 9/2007 | Goossen |
| 2007/0228214 A1 | 10/2007 | Horak |
| 2007/0244608 A1 | 10/2007 | Rath et al. |
| 2007/0262195 A1 | 11/2007 | Bulaga et al. |
| 2007/0271032 A1 | 11/2007 | Cheng et al. |
| 2007/0295298 A1 | 12/2007 | Mark |
| 2008/0023587 A1 | 1/2008 | Head et al. |
| 2008/0035786 A1 | 2/2008 | Bilyk et al. |
| 2008/0059068 A1 | 3/2008 | Strelow et al. |
| 2008/0071431 A1 | 3/2008 | Dockter et al. |
| 2008/0078865 A1 | 4/2008 | Burne |

FOREIGN PATENT DOCUMENTS

| | | |
|---|---|---|
| EP | 1868008 | 12/2007 |
| EP | 1767453 B1 | 6/2008 |
| WO | 0015497 | 3/2000 |
| WO | 2004002821 | 1/2004 |
| WO | 2007058643 | 5/2007 |

OTHER PUBLICATIONS

Brynestad, N. A. et al., "Investigation of the Flight Control Requirements of a Half-Scale Ducted Fan Unmanned Vehicle," Naval Postgraduate School Master's Thesis, Mar. 26, 1992, Abstract.

White, J.E. et al., "Stability Augmentation for a Free Flying Ducted Fan," Sandia National Labs, Dec. 15, 1986, Abstract.

Curtis, A.R.D., "Active Control of Fan Noise by Vane Actuators," GTE Internetworking Services Final Report, May 1999, Abstract.

* cited by examiner

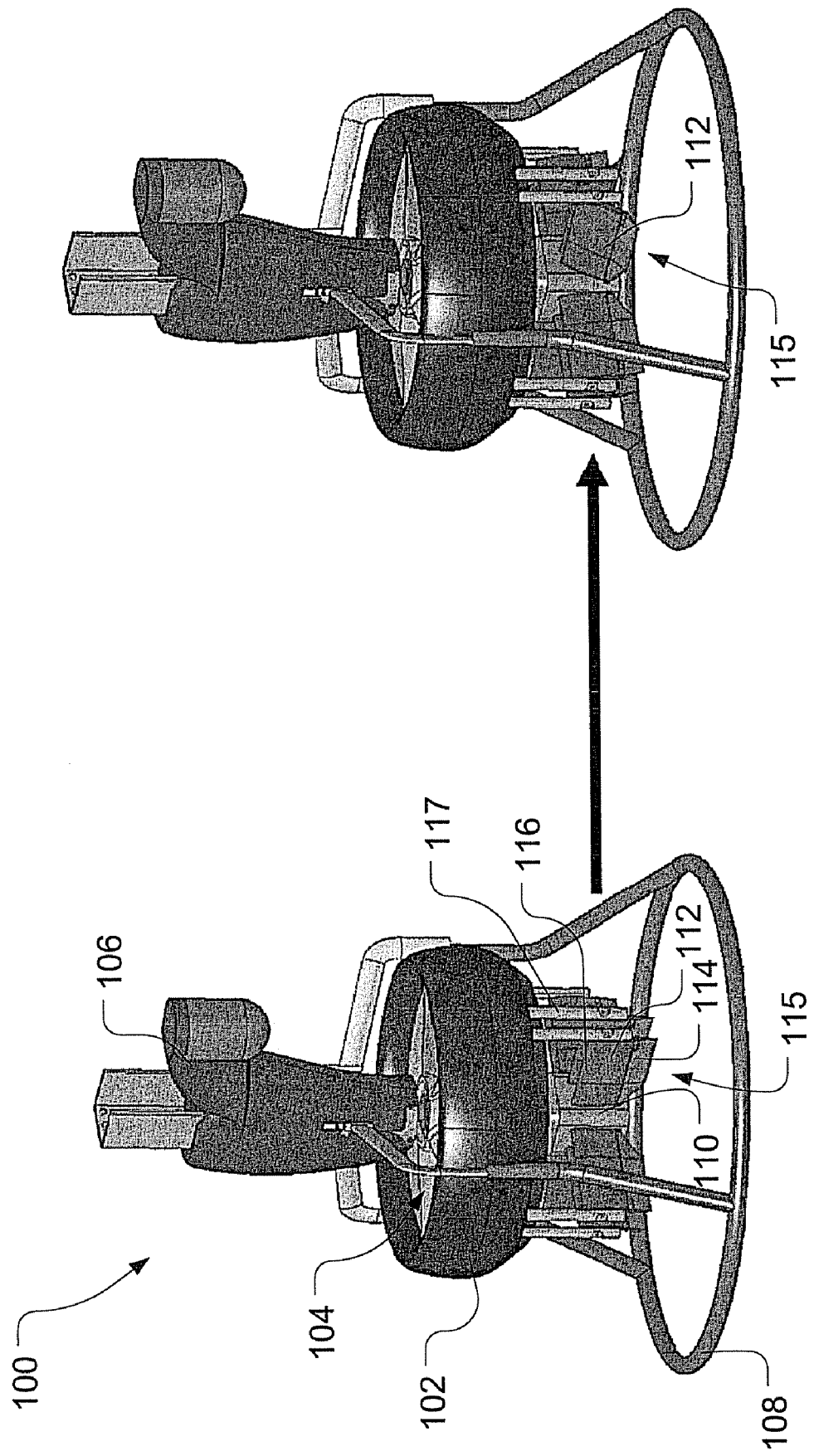

DUCTED FAN UAV CONTROL ALTERNATIVES

GOVERNMENT RIGHTS

The United States Government has acquired certain rights in this invention pursuant to Contract No. MDA972-01-9-0018, awarded by DARPA.

FIELD

The present invention relates generally to ducted fan air-vehicles, and more particularly, relates to flight control alternatives for ducted fan air-vehicles.

BACKGROUND

Ducted fan air-vehicles, such as an Unmanned Aerial Vehicle (UAV), may have at least one ducted fan and a fan engine to drive the fan blades. Ducted fan air-vehicles are well-known for performance capability in multiple flight conditions. For instance, ducted fan air-vehicles have the ability of forward flight and are well known for stationary hovering aerodynamic performance.

UAVs are remotely piloted or self-piloted aircraft that can carry cameras, sensors, communications equipment, or other payloads. A UAV is capable of controlled, sustained, level flight and is powered by either a jet or an engine. The UAVs may be remotely controlled or may fly autonomously based on pre-programmed flight plans or more complex dynamic automation systems.

UAVs have become increasingly used for various applications where the use of manned flight vehicles is not appropriate or is not feasible. Such applications may include military situations, such as surveillance, reconnaissance, target acquisition, data acquisition, communications relay, decoy, harassment, or supply flights. These vehicles are also used in a growing number of civilian applications, such as firefighting when a human observer would be at risk, police observation of civil disturbances or crime scenes, reconnaissance support in natural disasters, and scientific research, such as collecting data from within a hurricane.

Currently, a wide variety of UAV shapes, sizes, and configurations exist. Typically it is the payload of the aircraft that is the desired product, not the aircraft itself. A payload is what the aircraft is carrying. UAVs are the delivery system for a payload and are developed to fill a particular application and a set of requirements. As previously mentioned, there are numerous applications for which a UAV may be used. For each new application, a different type of payload may be used. Because different payloads may require different processing capabilities, or may comprise different sizes, a variation of the UAV typically must be developed for each type of payload, or a completely new aircraft typically must be designed. Designing a new aircraft or developing a variation of the current UAV in use is time-consuming and costly.

FIG. 1 is a pictorial representation of a typical ducted fan air-vehicle 100. The ducted fan air-vehicle 100 includes an air duct 102 having a fan 104 located within the air duct 102. The ducted fan air-vehicle may have a center body 106. The center body 106 may be a housing that contains other components of the air-vehicle 100, such as an engine 107 for powering the air-vehicle 100, a camera, or additional components for air-vehicle operation, such as an avionics system 109. The ducted fan air-vehicle 100 may also include a duct pod 113.

The ducted fan air-vehicle 100 may also include a stator assembly 110 and a plurality of fixed and/or movable vanes 112 for providing thrust vectoring for the air-vehicle 100. The stator assembly 110 and vanes 112 may be located downstream or under the fan 104 located within the air duct 102. The stator assembly 110 may be located just under the fan 104 in the air duct 102 to reduce or eliminate the swirl and torque produced by the fan 104. The vanes 112 may also be placed under the fan 104. For instance, the vanes 112 may be placed slightly below an exit section of the air duct 102. The vanes may also include moveable flap surfaces 114.

The ducted fan-air vehicle 100 may further include engine mounts 111 which support the center body 106. Engine mounts 111 also provide a connection for the landing gear 108 of the UAV.

In order to be effective and controllable in multiple flight conditions, ducted fan air-vehicles such as air-vehicle 100 preferably have clean and attached air flow around the duct lip in the multiple flight conditions. Further, ducted fan air-vehicles preferably have a favorable center of gravity in order to be effective and controllable. A uniform inflow velocity profile into the fan is also desirable to minimize the acoustic signature of the duct-fan interaction.

Additionally, ducted fan air-vehicles may need to carry a variety of components when in operation. For instance, in operation ducted fan air-vehicles may need to carry, without limitation, visual sensors, infrared sensors, cameras, radio communication devices, inertial sensor units, ground level sensor units, and/or payload. Due to the limited size of the ducted fan air-vehicle, in order to store the variety of units in the ducted fan, the units may be placed in external pods that are attached to the ducted fan air-vehicle. These pods may (i) cause a shift in the center of gravity, (ii) create negative interference with airflow characteristics inside the duct by blocking air intake and exhaust, and (iii) create additional drag on the UAV when the UAV is in forward flight. Additionally, the added weight of the equipment may require additional engine capacity and fuel storage capacity. It may be beneficial to increase the volume within the duct lip in order to decrease or eliminate the need for external pods while maintaining the aerodynamic requirements of a ducted fan air-vehicle.

Traditional multi-airfoil element control vane sets on ducted fans usually operate in tandem, or together, and may be operated by only one servo. However, if designed such that each vane is independently controlled, the vane pairs may be operated in an opposed fashion—that is they can be deflected towards each other to generate drag and hence generate moments and/or help trim vehicle thrust to enable better control of the ducted fan vehicle. Thus, it would be desirable to design a ducted fan vehicle in which each control vane is operated by its own servo.

SUMMARY

The present disclosure describes a ducted fan air-vehicle having an air duct, a fan, a center body, and a plurality of control vanes located within the air duct. Each control vane has a leading edge and has a separate servo for independently controlling each vane.

A method for controlling a ducted fan air-vehicle is also described. The method includes providing an air duct, a fan, and a center body, providing a plurality of control vanes located within or downstream of the air duct, each control vane having a leading edge, and providing a separate servo for each control vane. The method further includes deflecting the leading edges of two adjacent control vanes toward each other to generate a drag force on the air duct.

These as well as other aspects and advantages will become apparent to those of ordinary skill in the art by reading the following detailed description, with reference where appropriate to the accompanying drawings. Further, it is understood that this summary is merely an example and is not intended to limit the scope of the invention as claimed.

BRIEF DESCRIPTION OF THE DRAWINGS

Presently preferred embodiments are described below in conjunction with the appended drawing figures, wherein like reference numerals refer to like elements in the various figures, and wherein:

FIG. 2A is a pictorial representation of a ducted fan air-vehicle with the control vanes in a standard position;

FIG. 2B is a pictorial representation of the ducted fan air-vehicle of FIG. 2A with two control vanes deflected toward each other;

DETAILED DESCRIPTION

Figure 1:
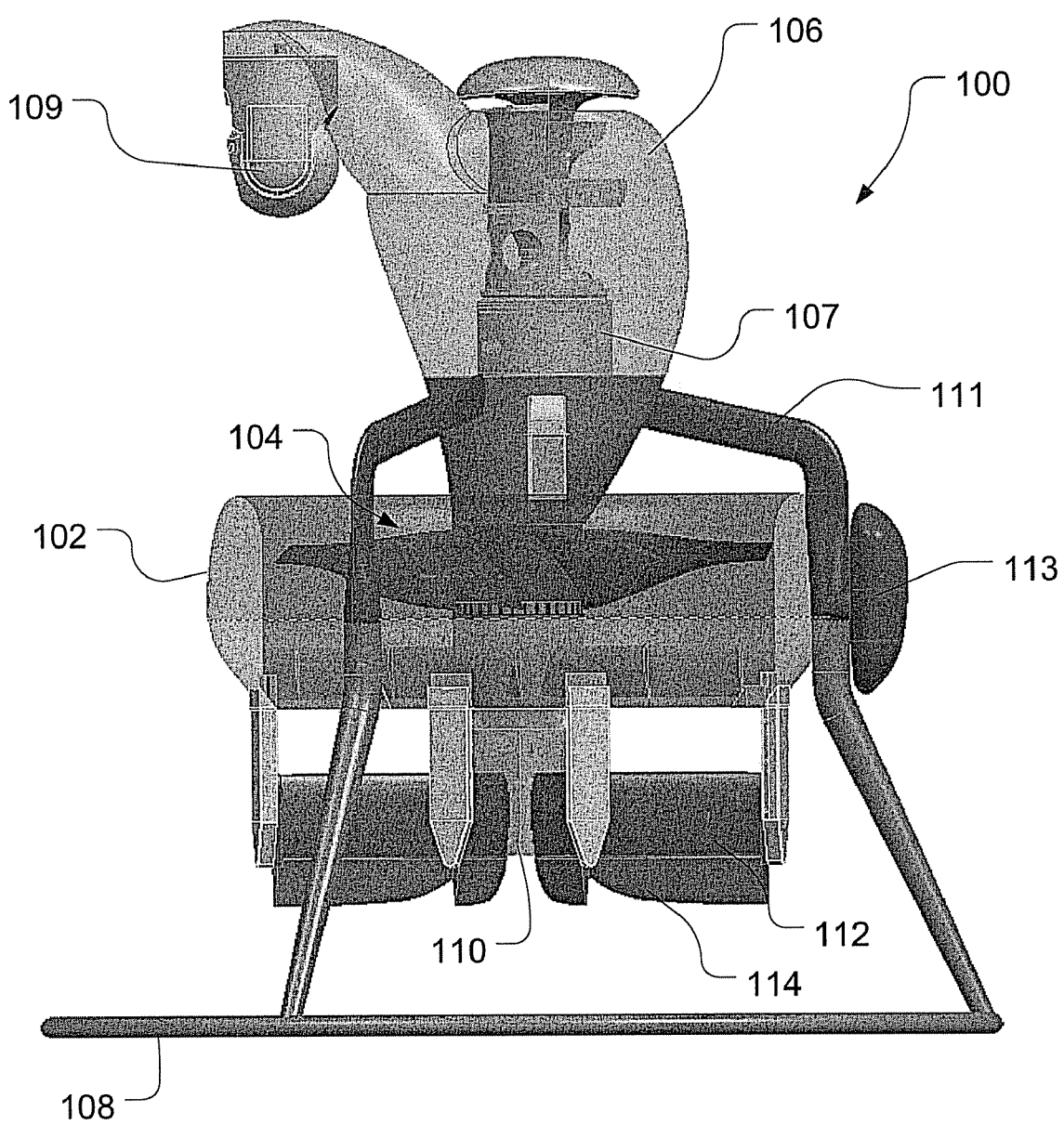
FIG. 1 is a pictorial representation of a ducted fan air-vehicle.

Ducted fan air-vehicles are known for their superior stationary aerodynamic hovering performance, three-dimensional precision position hold, low speed flights, precision vertical take-off and landing ("VTOL") and safe close-range operations. Ducted fan air-vehicles may be preprogrammed to perform operations autonomously, or they may be controlled by a human operator. Therefore, ducted fan air-vehicles may be unmanned aerial vehicles ("UAV").

UAVs may have avionics equipment on board to control the flight and operation of the UAV. For instance, the avionics may control the direction, flight, stability compensation, and other aspects of flight control. Additionally, UAVs may carry a variety of equipment on board tailored to the mission the UAVs are assigned to accomplish. UAVs may carry sensors on board to obtain information about surroundings, or the UAVs may carry a payload to be deposited at a target site. The UAV engine to drive the UAV requires that fuel be carried on board the UAV. The avionics equipment, sensors, payload, and fuel may be stored on the UAV.

In order to be effective and controllable in multiple flight conditions, ducted fan air-vehicles preferably have clean and attached air flow around the duct lip in the multiple flight conditions. Further, ducted fan air-vehicles preferably have a favorable center of gravity in order to be effective and controllable. A uniform inflow velocity profile into the fan is also desirable to minimize the acoustic signature of the duct-fan interaction.

Flight control of ducted fan-based UAVs depends on large amounts of control authority, especially when maneuvering in unsteady or turbulent winds. The design of the present application makes it possible to obtain additional control authority in one direction, or about one rotational axis of a ducted fan vehicle that uses otherwise conventional control vanes at the rear of the duct.

In a typical ducted fan air-vehicle, pairs of control vanes work together, or in tandem. The present application, however, uses de-coupled adjacent vanes. Each vane requires its own servo, or some other similar mechanism, to move independent of its neighboring vane surface. Using electric power, the servos provide mechanical torque to move and hold the control vanes in a certain position. Thus, the vanes move independently of each other. The leading edges of the control vanes may then be deflected toward each other, which generates a large drag force over that portion of the duct.

Referring to FIG. 2A, a ducted fan air-vehicle 100 is shown. The ducted fan air-vehicle 100 includes an air duct 102 having a fan 104 located within or downstream from the air duct 102. The ducted fan air-vehicle may also include a center body 106. The center body 106 may be a housing that contains other components of the air-vehicle 100, such as an engine 107 for powering the air-vehicle 100, a camera, or additional components for air-vehicle operation, such as an avionics system 109. The ducted fan-air vehicle 100 is stabilized when it is on the ground by landing gear 108. Although the landing gear 108 shown in the Figures is ring shaped, alternate types of landing gear may be used.

The ducted fan air-vehicle 100 may also include a stator assembly 110. The stator assembly 110 may be located just under the fan 104 in the air duct 102 to reduce or eliminate the swirl and torque produced by the fan 104 by providing the correct amount of anti-torque to counteract engine torque. The stator assembly 110 may also add to the vehicle's structural integrity.

The ducted fan air-vehicle 100 may also include a plurality of fixed or moveable control vanes 112 for providing the necessary forces and moments for vehicle control. The vanes 112 may be located under the fan 104 within the air duct 102. The vanes 112 may be connected to the air duct 102 by control vane supports 117. The vanes 112 may be placed slightly below an exit section of the air duct 102. The vanes 112 are placed in the fan airflow and away from the vehicle center of gravity (CG) location. The farther away the vanes 112 are placed from the CG, the better they are at providing moments for vehicle attitude control. The vanes may also include moveable flap surfaces 114 at a trailing edge 115. The flap surfaces 114 deflect as the control vanes 112 are deflected. The moveable flap surfaces 114 produce more lift than a single rigid surface. When leading edges 116 of control vanes 112 are deflected toward each other, a large amount of drag can be generated.

Figure 3A:
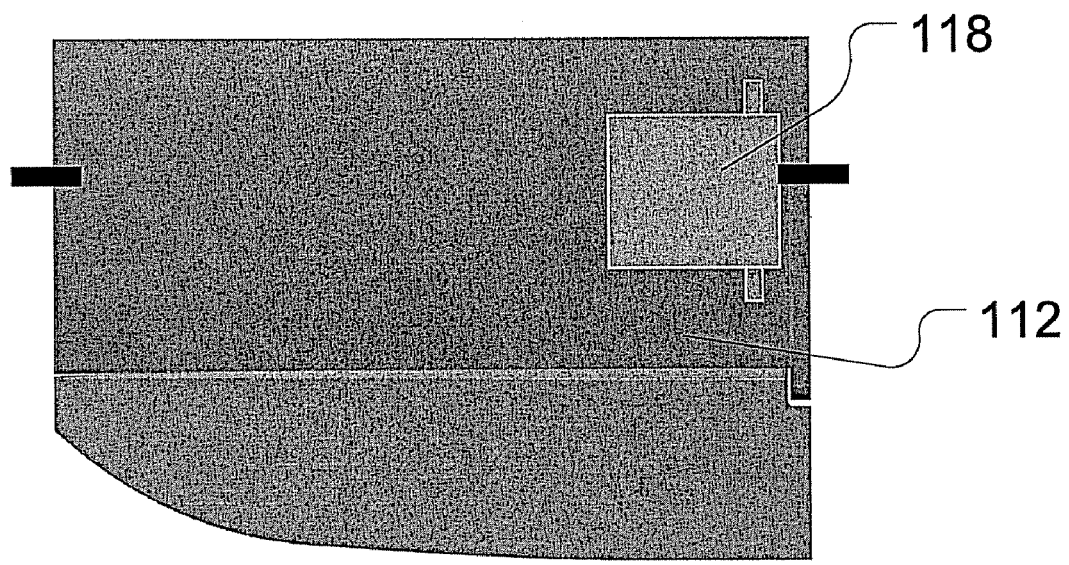
FIG. 3A is a pictorial representation of a servo mounted on or internal to a vane.
Figure 3B:
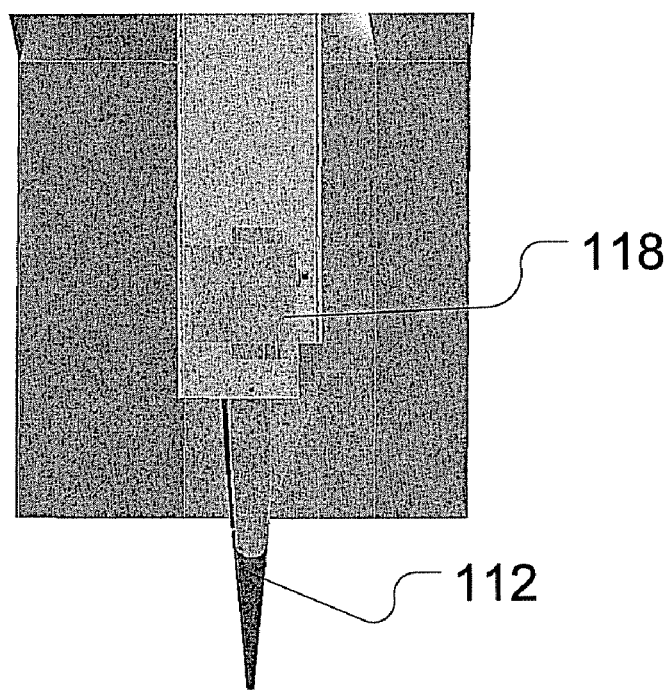
FIG. 3B is a pictorial representation of a servo mounted external to the vane.
Figure 4A:
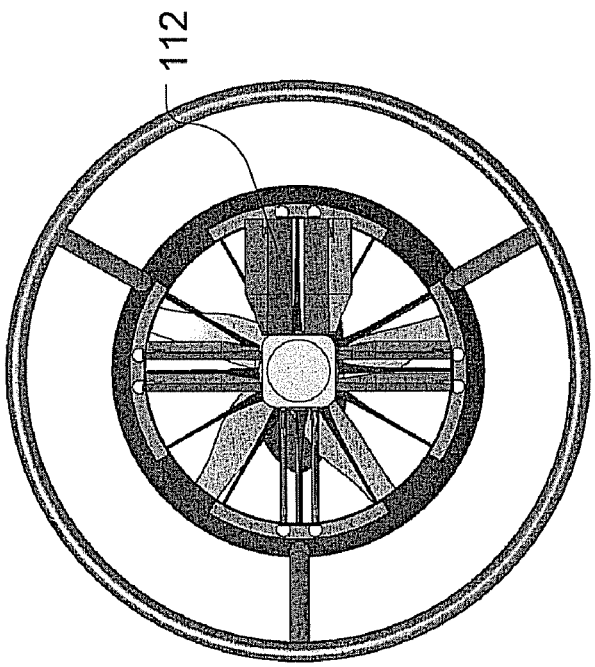
FIG. 4A is a pictorial representation of a bottom view of an air duct in a standard position.
Figure 4B:
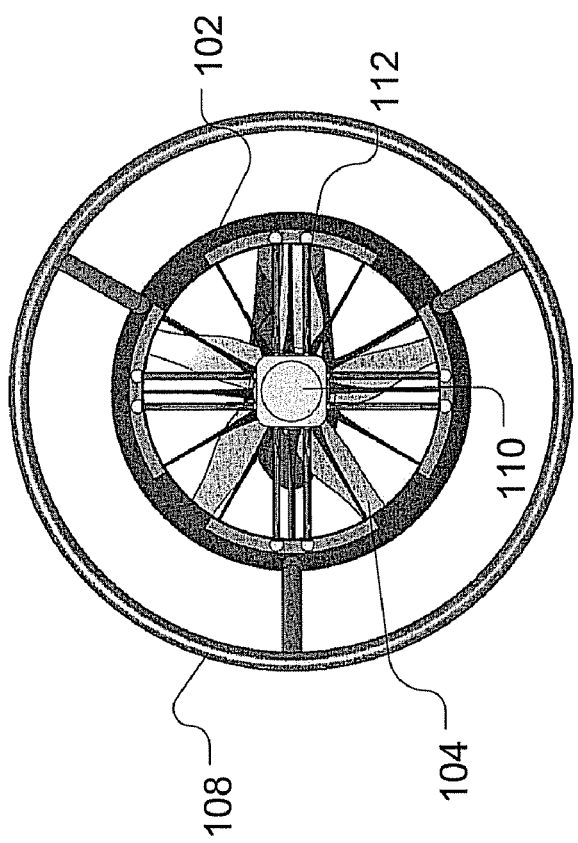
FIG. 4B is a pictorial representation of a bottom view of the air duct of FIG. 4A with two control vanes deflected toward each other.
Figure 5A:
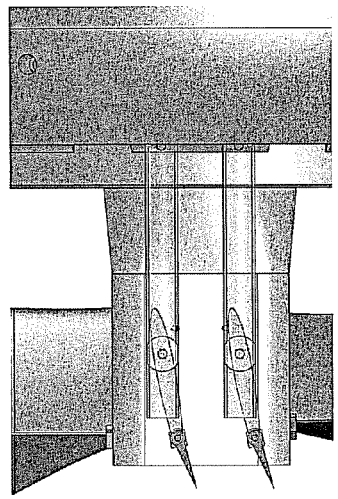
FIG. 5A-B are pictorial representations of sides views of vanes deflected in tandem.
Figure 5B:
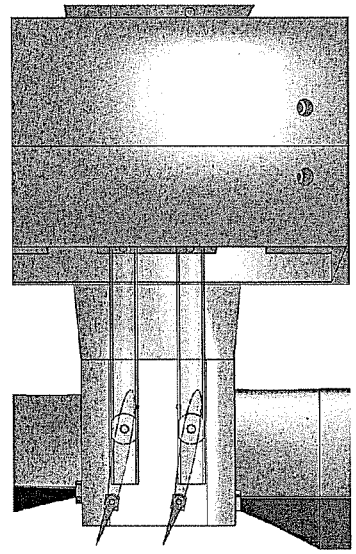
Figure 5C:
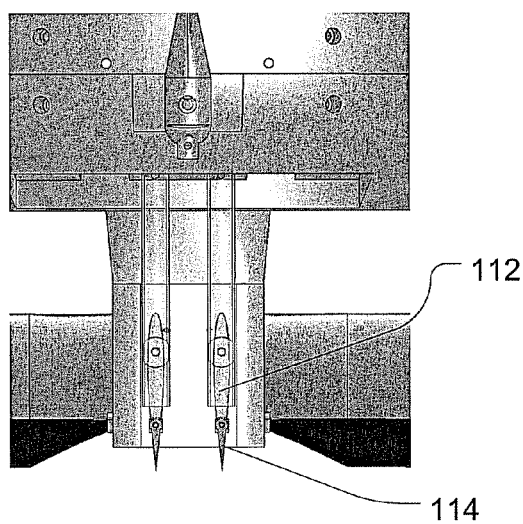
FIG. 5C-D are pictorial representations of sides views of vanes deflected in the manned according to the present application.
Figure 5D:
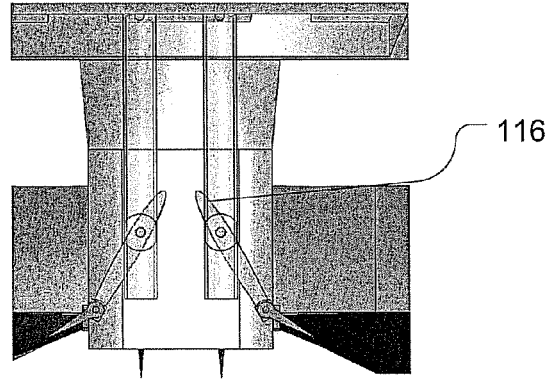

In the present application, the surface of each control vane 112 (8 surfaces total) requires its own servo or method of independent actuation. A servo converts electrical signals to mechanical power. The servo 118 may be mounted on, or internal to, the vanes 112 themselves, as shown in FIG. 3A, or may move the vanes via a system of linkages if externally mounted as shown in FIG. 3B. With each vane having its own servo 118, the vanes 112 are free to move independently. The vanes 112 may also generate large amounts of drag if the leading edges 116 of a vane pair are moved toward each other in a "closed" position, as shown in FIGS. 2B, 4B, and 5D.

Vehicle thrust may also be controlled to some degree by deflecting all four vane pairs 112 in a similar manner, simultaneously, to generate changes in overall vehicle thrust without changing the main fan speed or blade pitch angle. Since each vane has its own servo, the vanes can be used to produce pitch, roll, or yaw control moments to control the vehicle when operating in tandem (as shown in FIGS. 5A and 5B). Pitch, roll, and yaw moments are specific moments about the vehicle x, y, and z axis directions. This method of deflecting the vanes generates drag without any resulting forces in other directions, much like a drag brake on aircraft. Drag brakes have many different forms, but may be surfaces deployed to generate aerodynamic drag to help slow down an aircraft. In a similar manner, opposed vanes can generate aerodynamic drag to tailor thrust of the fan. Possible uses of this technique include small trim changes to thrust while in flight, or large thrust changes while on the ground as part of a rapid takeoff maneuver.

In operation, when the vehicle 100 is flying, it may encounter a strong unsteady wind or gust, which may tend to cause the vehicle to tilt in a different direction than it was originally travelling. It is important that a ducted fan vehicle (as pictured in FIG. 1) is able to quickly tilt into the wind to stabilize its flight in unsteady conditions. To achieve the required nose-down tilt into the wind, the vehicle must overcome the inherent nose-up pitch moment present on the windward side of the duct lip. Therefore, tilting a ducted fan aircraft into the wind requires overcoming its natural tendency to pitch away from the oncoming wind. The present application gives the vehicle 100 more control authority to tilt in the direction that it needs to move in for station keeping and other mission tasks.

In order to provide more nose-down pitch moment to tilt the vehicle, the leading edge of two control vanes 112 are deflected toward each other, which generates a large drag force on the front of the air duct 102. Only the pair of vanes 112 in the direction of desired tilt are closed, as shown in FIG. 4B. A flight control system, which may be part of the avionics system 109, controls the deflection of the vanes 112 by sending command signals to the servos. The flight control system is a collection of on-board electronics (sensors, computer, etc.), and is located wherever there is suitable space, such as in the center body 106. Some or all of the on-board electronics may also be located in the duct pod 113.

Another advantage of each vane having its own servo and being able to move independently is that the vehicle's thrust can be easily tailored. In an alternate embodiment, the same concept is used, but applied to all four control vane pairs. In this manner, the control vanes 112 provide a level of thrust control of the aircraft, independent of controlling the main lift fan's speed or blade pitch angle. This method may be useful for fine control of thrust levels for precision maneuvering or in cases when the fan speed or blade pitch angle may not respond quickly enough in turbulent wind conditions. Another situation may occur at takeoff when it is desired to provide maximum thrust as quickly as possible for rapid takeoff. With the four vane pairs in a "closed" position, the vehicle thrust is limited even though the fan may be running at full design speed. Rapid takeoff is then enabled by moving vanes quickly to zero deflection to provide full fan thrust.

The present application is counterintuitive because independent control vanes weigh more than pairs of vanes because there are more servos. While it is true that additional servos are required for this type of control system design (one per vane surface), at least two advantages over the prior art are gained by having servos for each vane. The first is that smaller servos can be used to help offset the required increase in weight, power, and space requirements. The second is system redundancy; if one servo fails, the vehicle has a better chance of retaining control compared to the conventional design, as there is not a complete loss of functionality of one vane pair.

While certain features and embodiments of the present application have been described in detail herein, it is to be understood that the application encompasses all modifications and enhancements within the scope and spirit of the following claims.

I claim:

1. A ducted fan air-vehicle comprising:
an air duct comprising a fan;
a center body connected to the air duct;
a plurality of pairs of control vanes located downstream from the fan, wherein each pair of control vanes of the plurality of pairs includes a first control vane and a second control vane, the first and second control vanes being adjacent to each other;
a separate servo for each control vane; and
a flight control system configured to independently control movement of each control vane via the respective servo of the control vane, wherein, for each pair of control vanes of the plurality of pairs, the flight control system is configured to deflect the first first and second control vanes towards each other.

2. The ducted fan air-vehicle of claim 1, wherein each control vane includes a moveable flap surface configured to deflect as the flight control system deflects the control vane.

3. The ducted fan air-vehicle of claim 1, wherein each servo is mounted onto a respective control vane of the plurality of pairs of control vanes.

4. The ducted fan air-vehicle of claim 1, wherein each servo is located outside of a respective control vane of the plurality of pairs of control vanes.

5. The ducted fan air-vehicle of claim 1, wherein the center body includes at least one of an engine, a camera, or an avionics system.

6. The ducted fan air-vehicle of claim 1, wherein the flight control system is configured to independently control two adjacent control vanes to deflect the leading edges of the two adjacent control vanes towards each other to generate a drag force on the air duct.

7. The ducted fan air-vehicle of claim 1, wherein the flight control system is configured to independently move control vanes of the plurality of pairs of control vanes to control pitch, roll, and yaw moments of the ducted fan air-vehicle.

8. The ducted fan air-vehicle of claim 1, wherein the flight control system is configured to move adjacent control vanes of the plurality of pairs of control vanes independently of each other.

9. The ducted fan air-vehicle of claim 1, wherein the flight control system is configured to independently two control vanes of each pair of control vanes of the plurality of pairs of control vanes to deflect leading edges of the first and second control vanes in a same direction and to deflect the leading edges of the first and second control vanes towards each other.

10. The ducted fan air-vehicle of claim 1, wherein the fan comprises a plurality of blades, and wherein the flight control system is configured to activate the servos of each control vane of the plurality of pairs of control vanes to simultaneously deflect the plurality of pairs of vanes to change a thrust of the air vehicle without changing a speed of the fan or changing a pitch angle of the blades of the fan.

11. The ducted fan air-vehicle of claim 1, wherein the flight control system is configured to activate the respective servos of the first and second control vanes of only one pair of control vanes of the plurality of pairs to deflect the first and second control vanes towards each other and tilt the ducted fan air vehicle.

12. A method for controlling a ducted fan air-vehicle, the method comprising:
with a flight control system of the ducted fan air-vehicle, independently controlling movement of at least two adjacent control vanes of a plurality of control vanes of the ducted fan air-vehicle, the ducted fan air-vehicle comprising:

an air duct comprising a fan;

the plurality of control vanes downstream of the fan, the plurality of control vanes comprising a plurality of pairs of control vanes, wherein each pair of control vanes of the plurality of pairs includes a first control vane and a second control vane, the first and second control vanes being adjacent to each other; and a separate servo for each control vane of the plurality of control vanes, wherein independently controlling movement of the at least two adjacent control vanes comprises, for each pair of control vanes, with the flight control system, independently actuating the respective servos of the at least two adjacent first and second control vanes to deflect the first and second control vanes towards each other.

13. The method of claim 12, wherein the plurality of control vanes comprises four pairs of adjacent control vanes and wherein independently controlling movement of the at least two adjacent control vanes comprises, with the flight control system, controlling the servos of each of the control vanes to deflect leading edges the control vanes of each pair toward each other.

14. The method of claim 12, wherein each servo is mounted onto or internal to a respective control vane of the plurality of control vanes.

15. The method of claim 12, wherein each servo is located outside of a respective control vane of the plurality of control vanes.

16. The method of claim 12, wherein independently controlling movement of the at least two adjacent control vanes comprises independently controlling at least one pair of control vanes of the plurality of control vanes to deflect leading edges of the first and second control vanes towards each other and generate a drag force on the air duct.

17. The method of claim 16, further comprising independently controlling the first and second control vanes of the at least one pair of control vanes to deflect leading edges of the first and second control vanes in a same direction.

18. The method of claim 12, wherein the fan comprises plurality of fan blades, and the method further comprises, with the flight control system, independently controlling movement of the plurality of control vanes to generate a change in a thrust of the ducted fan air-vehicle without changing a speed of the fan or pitch angle of the fan blades of the fan.

19. The method of claim 12, wherein the fan comprises blades, the method further comprising:

with the flight control system, activating the servos of each control vane of the plurality of control vanes to simultaneously deflect the plurality of control vanes to change a thrust of the air vehicle without changing a speed of the fan or changing a pitch angle of the blades of the fan.

20. The method of claim 12, further comprising, with the flight control system, activating the respective servos of the first and second control vanes of only one pair of control vanes of the plurality of pairs to deflect the first and second control vanes towards each other and tilt the ducted fan air vehicle.

* * * * *